UNITED STATES PATENT OFFICE.

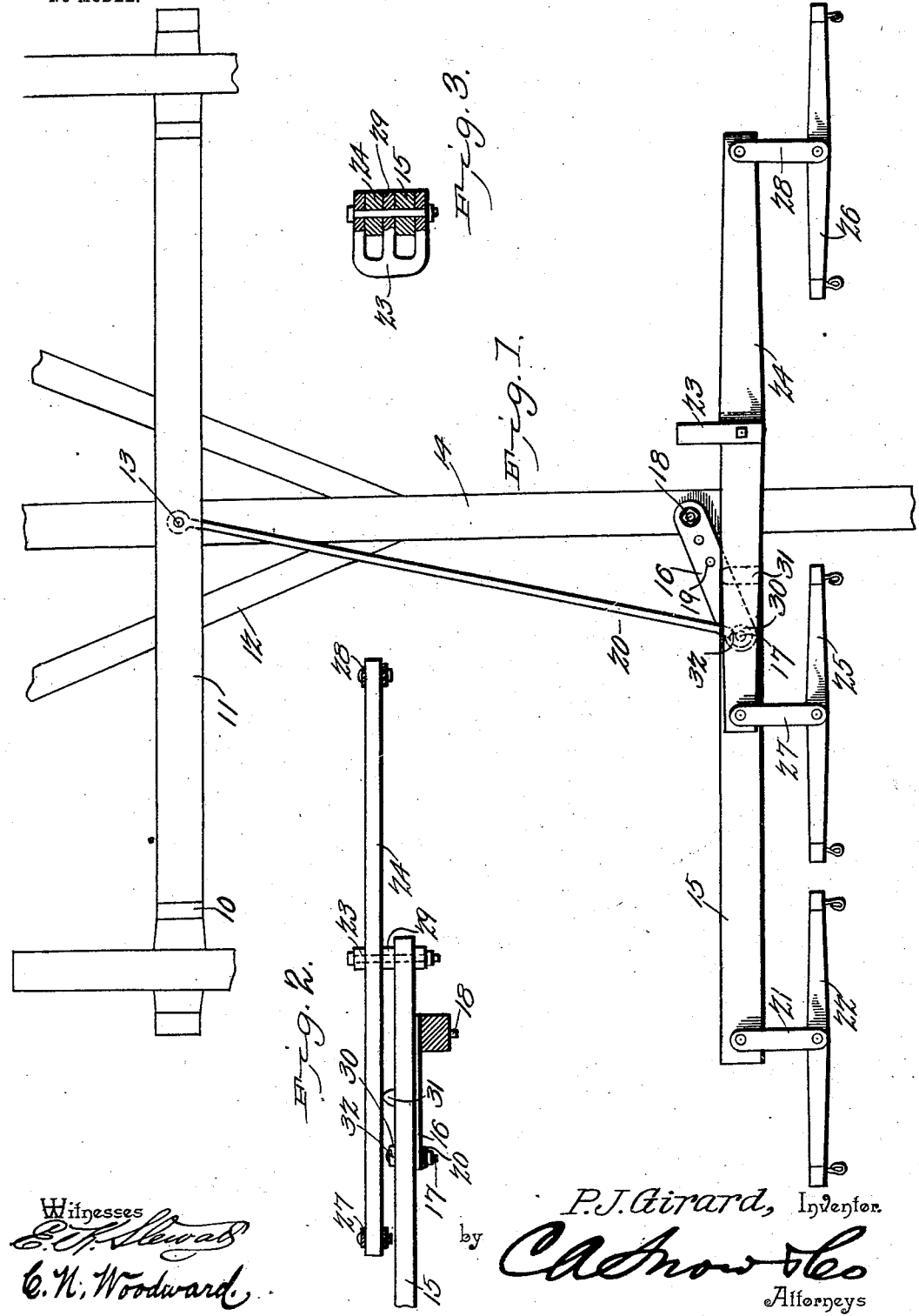

PETER J. GIRARD, OF FALLRIVER, WISCONSIN.

DRAFT-EQUALIZER.

SPECIFICATION forming part of Letters Patent No. 724,463, dated April 7, 1903.

Application filed January 13, 1903. Serial No. 138,914. (No model.)

*To all whom it may concern:*

Be it known that I, PETER J. GIRARD, a citizen of the United States, residing at Fallriver, in the county of Columbia and State of Wisconsin, have invented a new and useful Draft-Equalizer, of which the following is a specification.

This invention relates to devices employed for equalizing the draft of animals when one is placed upon one side of the draft pole or tongue and two upon the other side, and has for its object to cheapen the construction and increase the efficiency of devices of this character; and the invention consists in certain novel features of construction, as hereinafter shown and described, and specified in the claim.

In the drawings illustrative of the invention, in which corresponding parts are denoted by like designating characters, Figure 1 is a plan view of the device applied. Fig. 2 is a front elevation. Fig. 3 is a detached detail perspective view of the doubletree coupling-clip.

The equalizer which is the subject of the present invention may be employed upon a variety of vehicles, but is more particularly designed for use upon ordinary farm or lumber wagons, and for the purpose of illustration the device is shown applied to the draft-tongue and forward running-gear of a vehicle of this class, 10 representing the forward axle, 11 the bolster, 12 the hounds, 13 the king-bolt, and 14 the tongue.

The improved device consists in an evener-beam 15 of suitable length and connected by a link 16 to the tongue, the link being connected by one end to the beam nearer one end than the other, as at 17, and by the other end to the tongue, preferably by the pin 18, which usually couples the ordinary doubletree thereto.

When employed as a three-horse equalizer, the pivotal point 17 will be located about one-third the distance from one end of the beam, as indicated.

The end of the link 16 with which the pin 18 engages will be found with a plurality of perforations 19 to provide for the adjustment of the link relative to the tongue to regulate the movement and more thoroughly equalize the "draft" of the animals where there are differences in their strength and weight, as hereinafter explained.

Connected by its ends respectively to the pivot 17 and the king-bolt 13 is a draft-rod 20, the latter receiving the pull strain when the vehicle is drawn forward and transmitting them to the point 17 and equalizing and counteracting all lateral thrust.

The draft-rod 20 is forked where it is connected to the link 16 and beam 15, as shown at 30, so that it serves not only as a draft-rod, but likewise as a clip to support and firmly hold the parts together, and thus greatly strengthen the coupling without incasing the weight or expense.

Attached, as by clips 21, to the longer end of the beam 15 is a singletree 22, while similarly attached, as by clip 23, to the shorter end of the beam is a doubletree 24, to which the spaced singletrees 25 26 are coupled by clips 27 28 in the usual manner.

The clip 23 is of novel construction and is shown more clearly in Fig. 3, which represents this feature of the invention detached. This clip is formed with an intermediate tongue 29, which forms the interior into two compartments, one for the beam 15 and the other for the doubletree 24, the tongue 29 thus serving as a spacer to support the doubletree in spaced position from the beam and in position to swing over it when oscillated, and so that the doubletree will not strike any of the projecting parts, such as the forked end 30 of the rod 20. As a further guard the beam member 15 is provided with a stop-rib 31, over which the doubletree rides during its swinging movements and which prevents it from sagging at the end and striking any projecting part.

The two-part clip 23 29 is an important feature of the invention and materially decreases the friction between the parts, and thus increases the efficiency and ease of operation.

By this simple arrangement the single horse upon the longer end of the evener-beam will be able to support the beam 15 against the pull of the two horses upon the shorter end, and by transferring the line of draft by means of the draft-rod and link to one side of the tongue the side draft will be eliminated, and by forming the link 16 with the graduations the extent of this lateral transfer may be controlled and any variations in the power or weight of the horses correspondingly regulated, so that a perfect uniformity of draft will be maintained.

The beams and singletrees and doubletree will generally be of wood and the remainder of metal; but all the parts may be of metal, if preferred.

Having thus described the invention, what I claim is—

In a draft-equalizer, a draft-tongue, an evener-beam, a link pivoted by one end beneath said evener-beam at one side of its center and by the other end to said tongue, a draft-rod having a forked end embracing said evener-beam and link and coupled thereto by the pivot of the link, and connected by its opposite end to the running-gear in rearward alinement with the tongue, a singletree connected to the longer end of said evener-beam, a doubletree, a clip formed with spaced apertures respectively embracing said evener-beam and doubletree, and a guard-stop carried by said evener-beam to prevent contact between the doubletree and draft-rod, substantially as described.

In testimony that I claim the foregoing as my own I have hereto affixed my signature in the presence of two witnesses.

PETER J. GIRARD.

Witnesses:
L. BREUNING,
C. LINK, Jr.